June 3, 1924.
A. R. SELDEN
BEARING CLEANER
Filed Jan. 12, 1923
1,496,104
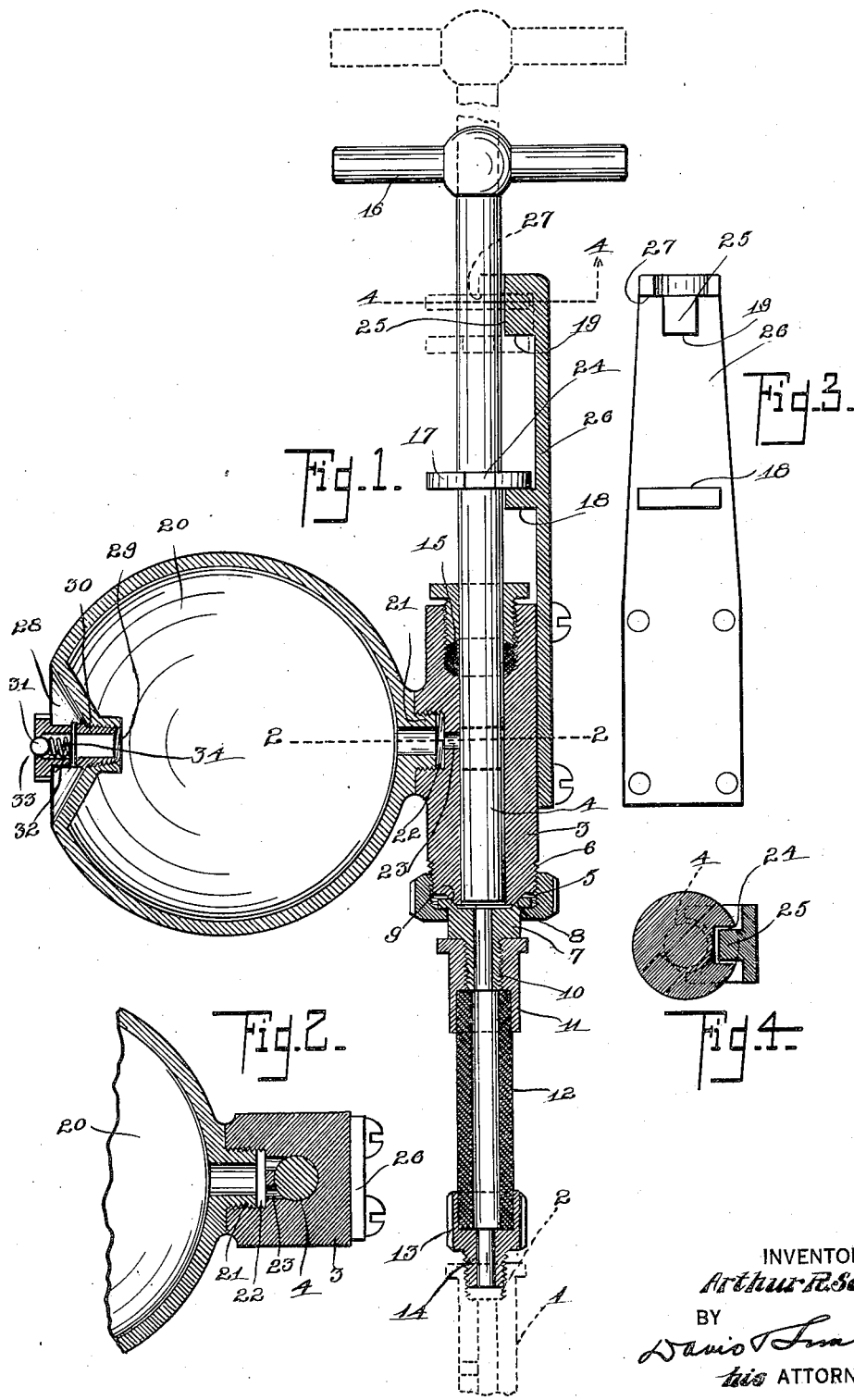
INVENTOR
Arthur R. Selden
BY
his ATTORNEYS.

Patented June 3, 1924.

1,496,104

UNITED STATES PATENT OFFICE.

ARTHUR R. SELDEN, OF ROCHESTER, NEW YORK.

BEARING CLEANER.

Application filed January 12, 1923. Serial No. 612,356.

*To all whom it may concern:*

Be it known that I, ARTHUR R. SELDEN, a citizen of the United States, and resident of Rochester, in the county of Monroe and State of New York, have invented certain new and useful Improvements in Bearing Cleaners, of which the following is a specification.

The present invention relates to a bearing cleaner for cleaning out grease or other lubricant from a bearing, such as a vehicle spring shackle, and an object of the invention is to provide a bearing cleaner which will produce a surging movement of a grease cutting liquid in the bearing, so as to remove effectively the hardened grease from the bearing and clean the latter. Another object of the invention is to provide a bearing cleaner having a supply means for a grease cutting liquid and a surge producing means having a cylinder connecting with said supply means, the connection between the supply means and the cylinder being controlled by a piston operating in the cylinder and producing the surging action.

To these and other ends, the invention consists of certain parts, and combinations of parts, all of which will be hereinafter described: the novel features being pointed out in the appended claims.

In the drawings:

Fig. 1 is a sectional view through a bearing cleaner, constructed in accordance with this invention;

Fig. 2 is a section on the line 2—2, Fig. 1;

Fig. 3 is a detail view of the member on which the limiting means for the surge producing piston is mounted; and Fig. 4 is a section on the line 4—4, Fig. 1.

At the present time, it is customary to lubricate spring and other bearings of vehicles by means of grease guns which force the lubricant into the bearings under heavy pressure. This grease after the use of the bearings for a certain time, becomes caked or hardened, so that it is impossible to move the same under the action of the grease gun and, as a consequence, considerable labor is required for cleaning a bearing to place it in condition for re-lubrication, and in many instances the opening of the bearing is required.

According to this invention a grease cutting liquid is fed to the bearing and means is employed for producing a surging action of the grease cutting liquid, so that the grease is subjected to agitation. In the illustrated embodiment of the invention, 1 indicates the bearing to be cleaned having as is common, a socket 2 provided with threaded walls. A surge producing means is employed, which, in this instance, comprises a cylinder 3 with a piston 4 operable therein in a manner to be described. The piston 3 connects with the bearing 1 through a connecting means, in this instance, embodying a collar 5 internally threaded and engaging external threads 6 on the cylinder. This collar secures the member 7 in binding engagement with the cylinder, the latter for this instance having a tapered portion 8 with which the tapering walls 9 of a socket formed in the member 7 engage. The member 7 has a nipple 10 with which an internally threaded coupling member 11 on a flexible tubing 12 connects. The other end of the flexible tubing has a coupling member 13 which preferably has a nipple 14 connecting with the socket 2 of the bearing 1. It is apparent that a grease cutting liquid such as creosote in the cylinder 3 in advance of the piston and also in the connection will be subject to the movement of the piston 4, this liquid when the piston is moved inwardly forcing the grease cutting liquid into the bearing 1, and when the piston is moved outwardly withdrawing such liquid from said bearing, the quick reciprocation of the piston thereby producing a surging action of the grease cutting liquid in the bearing. This surging action will eventually break down the grease and clean the bearing 1.

Movement of the piston 4 may be effected by extending the latter through a packing gland 15 on the cylinder 3 to the exterior of the cylinder and providing said piston with a handle 16. To limit the movement of the piston the latter may have a collar 17 surrounding the same and this collar may operate between limiting means formed by two stop surfaces 18 and 19 mounted on a carrier or stop holding member 26, the surface 18 limiting the inward movement of the piston to prevent the latter engaging the member 7 and the surface 19 limiting the outward movement of the piston on the surging movement thereof.

Provision is made for feeding the grease cutting liquid to the surge producing means.

In this instance, a supply means in the form of a reservoir 20 connects with the cylinder 3 through an outlet nipple 21 which engages the walls of a socket 22 formed in the side of a cylinder 3 and communicating by ports 23 with the chamber of the cylinder in which the piston or plunger 4 operates. These ports 23 are positioned beyond the range of the surge producing movement of the piston so that, after a desired amount of grease cutting liquid is fed to the cylinder 3, the piston will act as a valve to close communication between the reservoir and cylinder 3. In order to permit the additional or feeding movement of the plunger or piston 4, the stop collar 17 is provided with a notch 24 and the surface 19 is in the form of a projection 25 on the stop holding member 26, the projection 25 being of a sufficient width to pass through the notch 24 to align with said projection 25. A stop surface 27 on the holding member 26 limits the outward movement of the piston 24 on the feeding movement.

The reservoir 20 may have one wall with a funnel shaped portion 28 and at the base of this funnel shaped portion, an inlet or filling opening 29 may be provided. Normally this filling opening 29 is closed by a removable vent tube 30 which has a ball 31 operating therein between a cross piece 32 and a seat 33. This ball is held to its seat by a spring 34 and is adapted to be moved away from its seat by the finger, so as to admit air to the reservoir 20. When the piston or plunger 4 is moved to uncover the port 23, the liquid in the cylinder 3 flows through one of the ports 23, the other port acting to permit the escape of air from the cylinder 3 into the reservoir 20.

From the foregoing it will be seen that there has been provided a surge producing means adapted to be connected to a bearing for the purpose of creating a surging action of a grease cutting liquid in the bearing to effect the cutting of the grease therein and the cleaning thereof. This surge producing means connects with a supply means for a grease cutting liquid and is preferably in the form of a cylinder with a piston which has two movements, one for effecting the surging action and another for opening up the connection between the supply means and the cylinder in which the piston operates. Limiting means is provided for limiting the movement of the piston while producing the surging action, this limiting means having provision whereby a greater movement of the piston may take place for opening the supply of grease cutting liquid to the cylinder.

What I claim as my invention and desire to secure by Letters Patent is:

1. A bearing cleaner comprising surge producing means, supply means for a grease cutting liquid connected thereto and means for detachably connecting with a bearing to form a fluid tight connection with the bearing.

2. In a bearing cleaner, the combination with a supply means for a grease cutting liquid, of surge producing means embodying a cylinder having connection with said supply means, a piston movable in the cylinder to produce a surging action of the liquid received from the supply means and means for detachably connecting with a bearing to form a fluid tight connection with the bearing.

3. In a bearing cleaner, the combination with a supply means for a grease cutting liquid, of a cylinder connected with said supply means, a piston movable in the cylinder to produce a surging action of the cutting liquid in the cylinder having a movement beyond its surge producing movement to open the connection of the supply means with the cylinder in order to feed cutting liquid to the cylinder and means for detachably connecting with a bearing to form a fluid tight connection with the bearing.

4. In a bearing cleaner, the combination with a supply means for a grease cutting liquid, of a cylinder having a port in the wall thereof connecting with the supply means, a piston movable in the cylinder while holding said port closed to produce a surging action of grease cutting liquid fed to the cylinder by said supply means and movable to uncover said port to permit feeding of the grease cutting liquid to the cylinder and means for detachably connecting with a bearing to form a fluid tight connection with the bearing.

5. In a bearing cleaner, the combination with a supply means for a grease cutting liquid, of a cylinder having connection with said supply means, a piston operating in said cylinder and controlling the flow through said connection, and means for limiting the movement of the piston in the cylinder to prevent its opening said connection, said means having a portion movable to permit the movement of the piston to open the connection.

6. In a bearing cleaner, the combination with a supply means for a grease cutting liquid, of a cylinder having a port in its wall connecting with said supply means, a piston movable in the cylinder and arranged to cover and uncover said port, and means for limiting the movement of the piston in the cylinder to prevent its uncovering said port.

7. In a bearing cleaner, the combination with a supply means for a grease cutting liquid, of a cylinder having a port in its wall connecting with said supply means, a piston movable in the cylinder and arranged to cover and uncover said port, and means for limiting the movement of the piston in the cylinder to prevent its uncovering said port, said means embodying a notched collar movable with the piston and a projection formed with an abutment and arranged to pass through the notch of the collar when the latter is turned to a certain position to permit the piston to move to uncover the port.

8. A bearing cleaner comprising a cylinder having a port in a wall thereof, a reservoir connecting with the cylinder and communicating with said port, a piston movable in said cylinder and controlling said port, and means arranged to permit a movement of the piston while preventing the piston being moved to uncover the port.

9. In a bearing cleaner, a surge producing means, a reservoir connecting with said surge producing means and provided with a vented opening and means for detachably connecting with a bearing to form a fluid tight connection with the bearing.

10. A bearing cleaner comprising surge producing means and a reservoir having a filling opening, a funnel shaped portion about said opening, a venting closure for said filling opening and means for detachably connecting with a bearing to form a fluid tight connection with the bearing.

11. A bearing cleaner comprising surge producing means, a reservoir connecting with said surge producing means, and provided with a normally closed vent opening and means for detachably connecting with a bearing to form a fluid tight connection with the bearing.

12. A bearing cleaner comprising a cylinder having two ports in the wall thereof, a reservoir connecting with the cylinder and communicating with said ports, such reservoir having a normally closed vent opening, a piston moving in said cylinder and controlling said ports, and means for detachably connecting with a bearing to form a fluid tight connection with the bearing.

ARTHUR R. SELDEN.